(12) United States Patent
Yousif et al.

(10) Patent No.: US 12,704,632 B2
(45) Date of Patent: Aug. 11, 2026

(54) DETECTION OF A CHANGE IN A DRIVABLE AREA

(71) Applicant: FORD GLOBAL TECHNOLOGIES, LLC, Dearborn, MI (US)

(72) Inventors: Khalid Yousif, Milpitas, CA (US); Yong-Dian Jian, Pittsburgh, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 916 days.

(21) Appl. No.: 18/077,638

(22) Filed: Dec. 8, 2022

(65) Prior Publication Data

US 2024/0192371 A1 Jun. 13, 2024

(51) Int. Cl.
*G01S 17/89* (2020.01)
*G01S 17/931* (2020.01)

(52) U.S. Cl.
CPC ............ *G01S 17/89* (2013.01); *G01S 17/931* (2020.01)

(58) Field of Classification Search
CPC ........ G01S 17/89; G01S 17/931; G01S 17/86; G01C 21/3819; G01C 21/3848; G01C 21/3881; G01C 21/3815; G01C 21/3841
See application file for complete search history.

(56) References Cited

U.S. PATENT DOCUMENTS

2007/0280528 A1* 12/2007 Wellington .......... G06V 10/457 382/154
2010/0030473 A1* 2/2010 Au ......................... G06V 20/56 701/28
2012/0039526 A1* 2/2012 Garaas ............ G08B 13/19641 382/154
2017/0369051 A1* 12/2017 Sakai .................. G06V 10/255
2018/0188043 A1* 7/2018 Chen ....................... G06T 17/20
2018/0190016 A1* 7/2018 Yang ................. G01C 21/3867
2019/0139403 A1* 5/2019 Alam .................. G08G 1/0112
2019/0332118 A1* 10/2019 Wang .................. G05D 1/0214
2021/0049374 A1* 2/2021 Silver ................. G06V 10/762
2022/0146277 A1* 5/2022 Lambert ............. G05D 1/0231
2024/0028041 A1* 1/2024 Klaus .................... G01S 17/931
2024/0310851 A1* 9/2024 Ebrahimi Afrouzi ... G01S 17/87
2025/0381952 A1* 12/2025 Klaus .................... B60W 30/09
2025/0381980 A1* 12/2025 Klaus ................. B60W 60/001
2025/0383450 A1* 12/2025 Klaus .................... G01S 17/931
2026/0065646 A1* 3/2026 Park .................. G06V 10/7715

* cited by examiner

*Primary Examiner* — Fernando Alcon
(74) *Attorney, Agent, or Firm* — Frank A. MacKenzie; Brooks Kushman, P.C.

(57) ABSTRACT

Disclosed herein are system, method, and computer program product embodiments for detecting a change in a drivable area. For example, the method includes determining a ground height associated with a cell of a tile map based on sensor data from a sensor of a vehicle and updating a base map based on a determination that there is a change in a drivable area of the vehicle based on at least the ground height.

14 Claims, 5 Drawing Sheets

DETECTION OF A CHANGE IN A DRIVABLE AREA

BACKGROUND

Autonomous vehicles (AVs) rely on maps to navigate in a real-word environment during operation. A map may be a set of digital files including data identifying physical details of a geographic area such as roads, lanes within roads, traffic signals and signs, road surface markings, and drivable areas. The map may be generated using images of the surroundings captured by vehicles equipped with sensors such as light detection and ranging system (LiDAR), cameras, radar, and the like. An AV may receive the map before operation. The AV may use the map to augment the information that the AV's on-board perception system (e.g., cameras, LiDAR system) perceive.

In general, contents of the received map are static until the AVs download/receive an updated map. Map changes can occur due to new road constructions, repainting of roads, construction projects that may result in temporary lane changes and/or detours. Maps can change several times per day. For example, drivable areas frequently change due to a number of factors such as changes in fixtures (e.g., bollards, telephone booths, portable restrooms, bike racks), changes in road barriers (e.g., medians, roundabouts, road dividers), and changes in road widths (e.g., extended or narrowed curbs and sidewalks). These changes may be not reflected in a base map being utilized by the AV and thus may affect the area in which an AV may operate. Thus, the maps are no longer accurate and cannot be relied on.

SUMMARY

In some aspects, a method includes determining a ground height associated with a cell of a tile map based on sensor data from a sensor of a vehicle and updating a base map based on a determination that there is a change in a drivable area of the vehicle based on at least the ground height.

In some aspects, a system includes at least one processor coupled to the memory. The at least one processor is configured to perform operations. The operations includes determining a ground height associated with a cell of a tile map based on sensor data from a sensor of a vehicle, and updating a base map based on a determination that there is a change in a drivable area of the vehicle based on at least the ground height.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
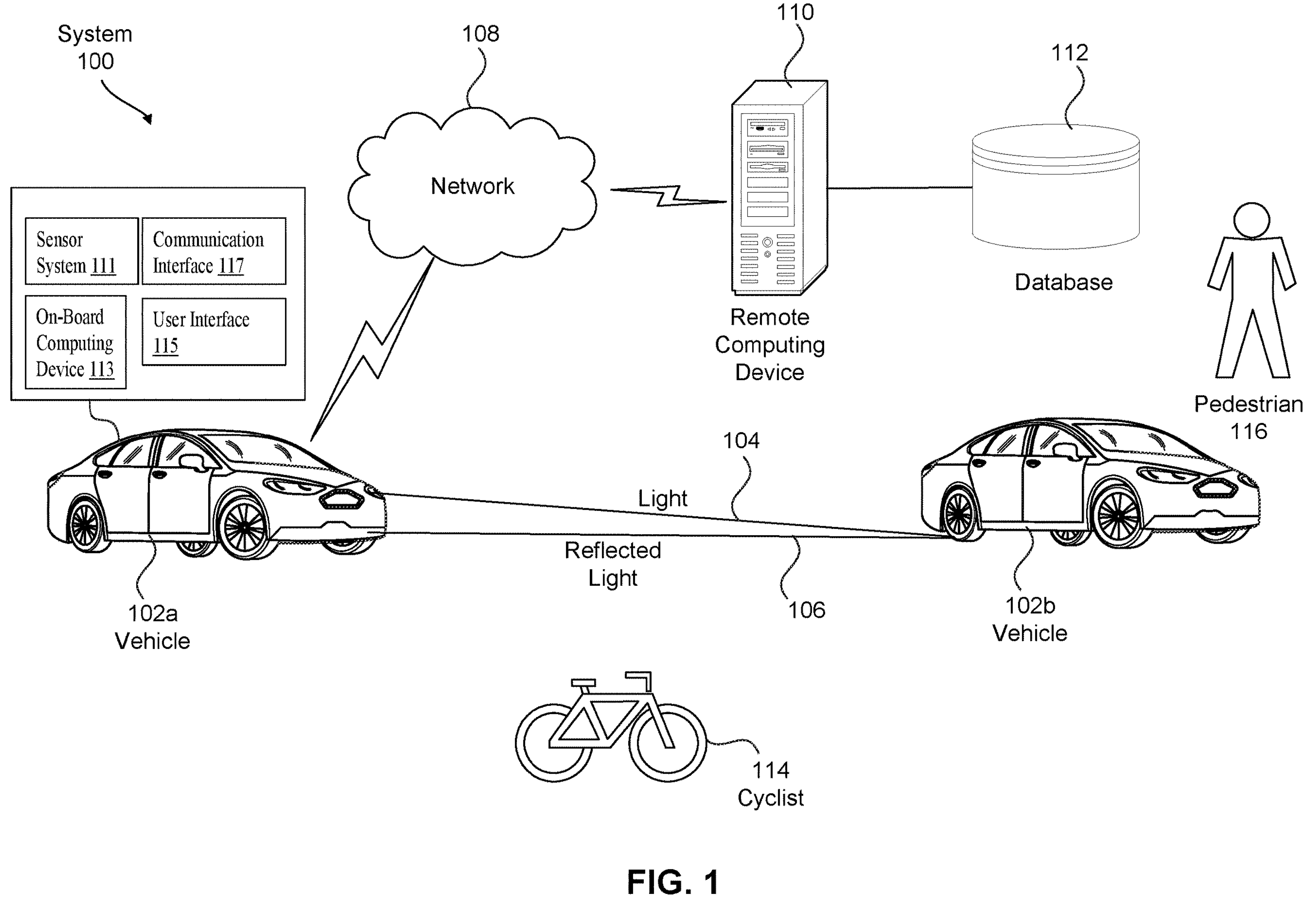
FIG. 1 illustrates an exemplary autonomous vehicle system, in accordance with aspects of the disclosure.

Provided herein are system, apparatus, device, method and/or computer program product embodiments, and/or combinations and sub-combinations thereof, for detecting and handling changes in a drivable area of an autonomous vehicle (AV).

The AV may rely on a map (e.g., a base map, an a priori map, an a priori high definition (HD) map) of an operating area. The map may refer to a pre-generated map that is downloaded onto the AV and is used by the AV to help navigate its surroundings. The map may include information associated with the operating area. For example, the map may specify a geometry of a drivable area and lane markings, lane marking types, a direction of a lane, a speed limit associated with the lane, and traffic controls including traffic signs and traffic signals. The drivable area may refer to any area where the AV may drive (e.g., an area that does not include a structure that may damage the vehicle). A non-drivable area may refer to an area with ground heights that are significantly above a road surface (e.g., any area that includes a structure or may damage the vehicle).

Drivable areas frequently change due to a number of factors. Fixtures such as bollards, telephone booths, portable restrooms, or bike racks may be added or removed from the road. Road barriers such as medians, roundabouts, or road dividers may be added or removed and curbs or sidewalks may be extended or narrowed. Thus, the map may not be accurate.

In some embodiments, changes in the drivable area are handled through dynamic map updates. This provides the advantage that all components of the AV that rely on the map receive the same and accurate updates in a timely manner (e.g., in real-time or near real-time). In addition, the approaches described herein does not necessitate any additional changes in a motion planning task or a prediction task of the AV. In some aspects, the dynamic map updates may be via a vector map updates that includes drivable area changes.

In some embodiments, the systems and methods described herein may detect changes to the drivable area due speed bumps and potholes, construction barriers and cones.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

Notably, the present solution is being described herein in the context of an autonomous vehicle. However, the present solution is not limited to autonomous vehicle applications. The present solution may be used in other applications such as robotic applications, radar system applications, metric applications, and/or system performance applications.

FIG. 1 illustrates an exemplary autonomous vehicle system 100, in accordance with aspects of the disclosure. System 100 comprises a vehicle 102*a* that is traveling along a road in a semi-autonomous or autonomous manner. Vehicle 102*a* is also referred to herein as AV 102*a*. AV 102*a* can include, but is not limited to, a land vehicle (as shown in FIG. 1), an aircraft, or a watercraft.

AV 102*a* is generally configured to detect objects 102*b*, 114, 116 in proximity thereto. The objects can include, but are not limited to, a vehicle 102*b*, cyclist 114 (such as a rider of a bicycle, electric scooter, motorcycle, or the like) and/or a pedestrian 116.

As illustrated in FIG. 1, the AV 102*a* may include a sensor system 111, an on-board computing device 113, a communications interface 117, and a user interface 115. Autonomous vehicle 101 may further include certain components (as illustrated, for example, in FIG. 2) included in vehicles, which may be controlled by the on-board computing device 113 using a variety of communication signals and/or commands, such as, for example, acceleration signals or commands, deceleration signals or commands, steering signals or commands, braking signals or commands, etc.

Figure 2:
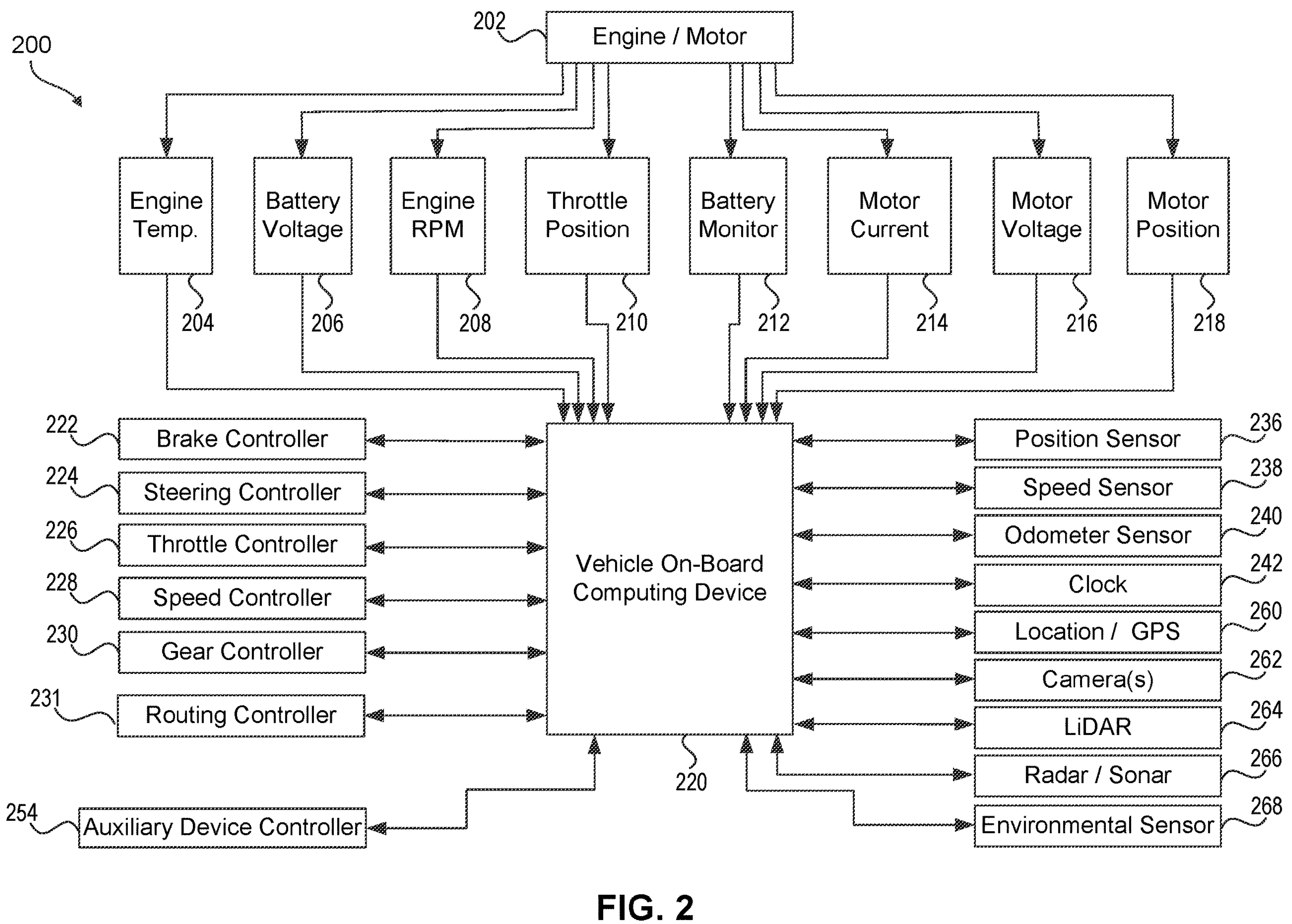
FIG. 2 illustrates an exemplary architecture for a vehicle, in accordance with aspects of the disclosure.

The sensor system 111 may include one or more sensors that are coupled to and/or are included within the AV 102*a*, as illustrated in FIG. 2. For example, such sensors may include, without limitation, a light detection and ranging system (LiDAR) system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the AV 102*a*, information about the environment itself, information about the motion of the AV 102*a*, information about a route of the vehicle, or the like. As AV 102*a* travels over a surface, at least some of the sensors may collect data pertaining to the surface.

As will be described in greater detail, AV 102*a* may be configured with a lidar system, e.g., LiDAR system 264 of FIG. 2. The LiDAR system may be configured to transmit a light pulse 104 to detect objects located within a distance or range of distances of AV 102*a*. Light pulse 104 may be incident on one or more objects (e.g., AV 102*b*) and be reflected back to the LiDAR system. Reflected light pulse 106 incident on the LiDAR system may be processed to determine a distance of that object to AV 102*a*. The reflected light pulse may be detected using, in some embodiments, a photodetector or array of photodetectors positioned and configured to receive the light reflected back into the LiDAR system. LiDAR information, such as detected object data, is communicated from the LiDAR system to an on-board computing device, e.g., on-board computing device 220 of FIG. 2. The AV 102*a* may also communicate LiDAR data to a remote computing device 110 (e.g., cloud processing system) over communications network 108. Remote computing device 110 may be configured with one or more servers to process one or more processes of the technology described herein. Remote computing device 110 may also be configured to communicate data/instructions to/from AV 102*a* over network 108, to/from server(s) and/or database(s) 112.

It should be noted that the LiDAR systems for collecting data pertaining to the surface may be included in systems other than the AV 102*a* such as, without limitation, other vehicles (autonomous or driven), robots, satellites, etc.

Network 108 may include one or more wired or wireless networks. For example, the network 108 may include a cellular network (e.g., a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

AV 102*a* may retrieve, receive, display, and edit information generated from a local application or delivered via network 108 from database 112. Database 112 may be configured to store and supply raw data, indexed data, structured data, map data, program instructions or other configurations as is known.

The communications interface 117 may be configured to allow communication between AV 102*a* and external systems, such as, for example, external devices, sensors, other vehicles, servers, data stores, databases etc. The communications interface 117 may utilize any now or hereafter known protocols, protection schemes, encodings, formats, packaging, etc. such as, without limitation, Wi-Fi, an infrared link, Bluetooth, etc. The user interface 115 may be part of peripheral devices implemented within the AV 102*a* including, for example, a keyboard, a touch screen display device, a microphone, and a speaker, etc.

FIG. 2 illustrates an exemplary system architecture 200 for a vehicle, in accordance with aspects of the disclosure. Vehicles 102*a* and/or 102*b* of FIG. 1 can have the same or similar system architecture as that shown in FIG. 2. Thus, the following discussion of system architecture 200 is sufficient for understanding vehicle(s) 102*a*, 102*b* of FIG. 1. However, other types of vehicles are considered within the scope of the technology described herein and may contain more or less elements as described in association with FIG. 2. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 2, system architecture 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute ("RPM") sensor 208, and a throttle position sensor 210. If the vehicle is an electric or hybrid vehicle, then the vehicle may have an electric motor, and accordingly includes sensors such as a battery monitoring system 212 (to measure current, voltage and/or temperature of the battery), motor current 214 and voltage 216 sensors, and motor position sensors 218 such as resolvers and encoders.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock

242 may be encoded into the vehicle on-board computing device, it may be a separate device, or multiple clocks may be available.

The vehicle also includes various sensors that operate to gather information about the environment in which the vehicle is traveling. These sensors may include, for example: a location sensor 260 (e.g., a Global Positioning System ("GPS") device); object detection sensors such as one or more cameras 262; a LiDAR system 264; and/or a radar and/or a sonar system 266. The sensors also may include environmental sensors 268 such as a precipitation sensor and/or ambient temperature sensor. The object detection sensors may enable the vehicle to detect objects that are within a given distance range of the vehicle 200 in any direction, while the environmental sensors collect data about environmental conditions within the vehicle's area of travel.

During operations, information is communicated from the sensors to a vehicle on-board computing device 220. The on-board computing device 220 may be implemented using the computer system of FIG. 5. The vehicle on-board computing device 220 analyzes the data captured by the sensors and optionally controls operations of the vehicle based on results of the analysis. For example, the vehicle on-board computing device 220 may control: braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers. Auxiliary device controller 254 may be configured to control one or more auxiliary devices, such as testing systems, auxiliary sensors, mobile devices transported by the vehicle, etc.

Geographic location information may be communicated from the location sensor 260 to the on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as LiDAR system 264 is communicated from those sensors) to the on-board computing device 220. The object detection information and/or captured images are processed by the on-board computing device 220 to detect objects in proximity to the vehicle 200. Any known or to be known technique for making an object detection based on sensor data and/or captured images can be used in the embodiments disclosed in this document.

LiDAR information is communicated from LiDAR system 264 to the on-board computing device 220. Additionally, captured images are communicated from the camera(s) 262 to the vehicle on-board computing device 220. The LiDAR information and/or captured images are processed by the vehicle on-board computing device 220 to detect objects in proximity to the vehicle 200. The manner in which the object detections are made by the vehicle on-board computing device 220 includes such capabilities detailed in this disclosure.

The on-board computing device 220 may include and/or may be in communication with a routing controller 231 that generates a navigation route from a start position to a destination position for an autonomous vehicle. The routing controller 231 may access a map data store to identify possible routes and road segments that a vehicle can travel on to get from the start position to the destination position. The routing controller 231 may score the possible routes and identify a preferred route to reach the destination. For example, the routing controller 231 may generate a navigation route that minimizes Euclidean distance traveled or other cost function during the route, and may further access the traffic information and/or estimates that can affect an amount of time it will take to travel on a particular route. Depending on implementation, the routing controller 231 may generate one or more routes using various routing methods, such as Dijkstra's algorithm, Bellman-Ford algorithm, or other algorithms. The routing controller 231 may also use the traffic information to generate a navigation route that reflects expected conditions of the route (e.g., current day of the week or current time of day, etc.), such that a route generated for travel during rush-hour may differ from a route generated for travel late at night. The routing controller 231 may also generate more than one navigation route to a destination and send more than one of these navigation routes to a user for selection by the user from among various possible routes.

In various embodiments, the on-board computing device 220 may determine perception information of the surrounding environment of the AV 102*a*. Based on the sensor data provided by one or more sensors and location information that is obtained, the on-board computing device 220 may determine perception information of the surrounding environment of the AV 102*a*. The perception information may represent what an ordinary driver would perceive in the surrounding environment of a vehicle. The perception data may include information relating to one or more objects in the environment of the AV 102*a*. For example, the on-board computing device 220 may process sensor data (e.g., LiDAR or RADAR data, camera images, etc.) in order to identify objects and/or features in the environment of AV 102*a*. The objects may include traffic signals, road way boundaries, other vehicles, pedestrians, and/or obstacles, etc. The on-board computing device 220 may use any now or hereafter known object recognition algorithms, video tracking algorithms, and computer vision algorithms (e.g., track objects frame-to-frame iteratively over a number of time periods) to determine the perception.

In some embodiments, the on-board computing device 220 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 220 may perform one or more prediction and/or forecasting operations. For example, the on-board computing device 220 may predict future locations, trajectories, and/or actions of one or more objects. For example, the on-board computing device 220 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the AV 102*a*, the surrounding environment, and/or their relationship(s). For example, if an object is a vehicle and the current driving environment includes an intersection, the on-board computing device 220 may predict whether the object will likely move straight forward or make a turn. If the perception data indicates that the intersection has no traffic light, the on-board computing device 220 may also predict whether the vehicle may have to fully stop prior to enter the intersection.

In various embodiments, the on-board computing device 220 may determine a motion plan for the autonomous vehicle. For example, the on-board computing device 220 may determine a motion plan for the autonomous vehicle based on the perception data and/or the prediction data. Specifically, given predictions about the future locations of proximate objects and other perception data, the on-board computing device 220 can determine a motion plan for the AV 102*a* that best navigates the autonomous vehicle relative to the objects at their future locations.

In some embodiments, the on-board computing device 220 may receive predictions and make a decision regarding how to handle objects and/or actors in the environment of the AV 102*a*. For example, for a particular actor (e.g., a vehicle with a given speed, direction, turning angle, etc.), the on-board computing device 220 decides whether to overtake, yield, stop, and/or pass based on, for example, traffic conditions, map data, state of the autonomous vehicle, etc. Furthermore, the on-board computing device 220 also plans a path for the AV 102*a* to travel on a given route, as well as driving parameters (e.g., distance, speed, and/or turning angle). That is, for a given object, the on-board computing device 220 decides what to do with the object and determines how to do it. For example, for a given object, the on-board computing device 220 may decide to pass the object and may determine whether to pass on the left side or right side of the object (including motion parameters such as speed). The on-board computing device 220 may also assess the risk of a collision between a detected object and the AV 102*a*. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the on-board computing device 220 may execute one or more control instructions to perform a cautious maneuver (e.g., mildly slow down, accelerate, change lane, or swerve). In contrast, if the collision cannot be avoided, then the on-board computing device 220 may execute one or more control instructions for execution of an emergency maneuver (e.g., brake and/or change direction of travel).

As discussed above, planning and control data regarding the movement of the autonomous vehicle is generated for execution. The on-board computing device 220 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

Figure 3:
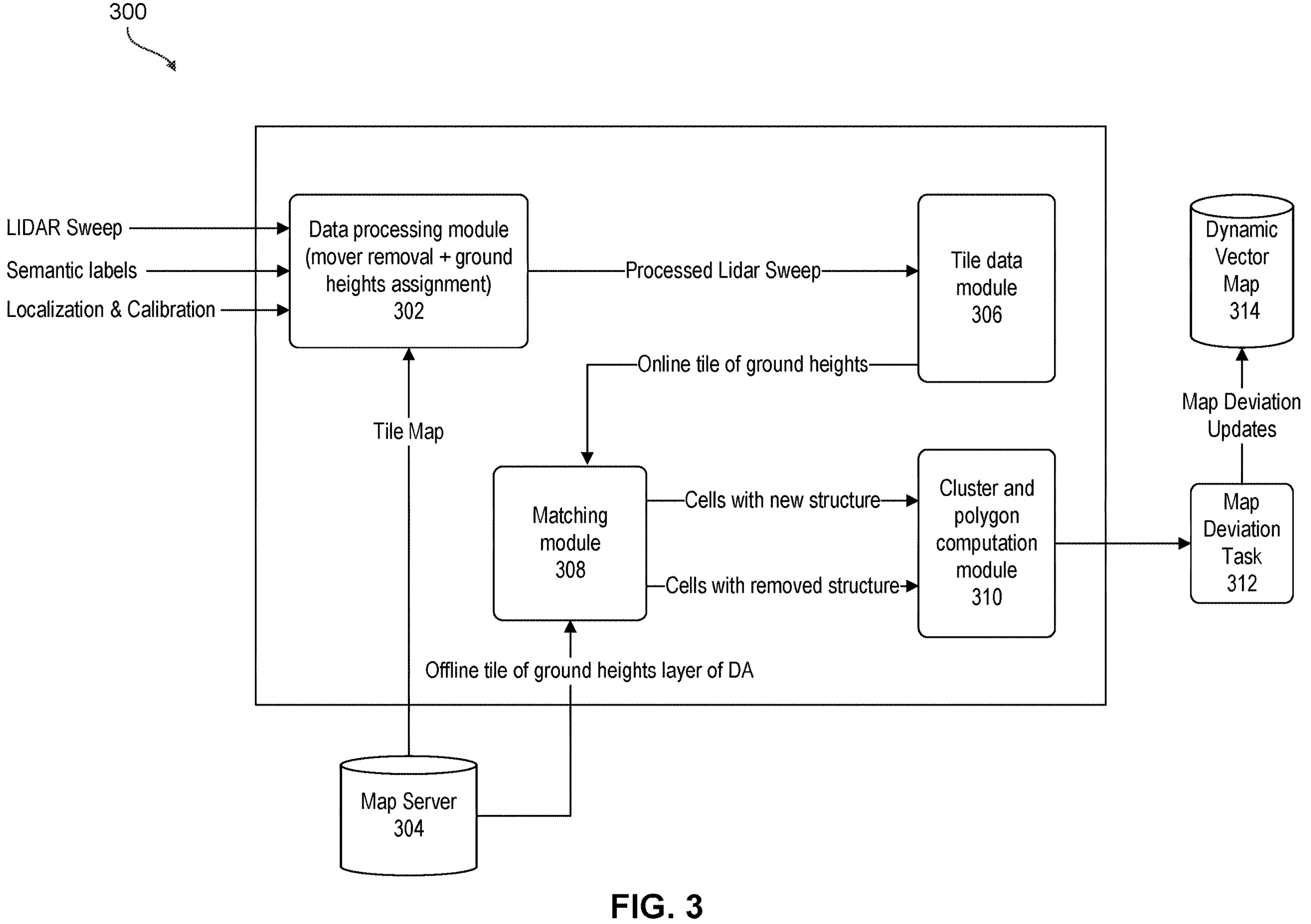
FIG. 3 is a diagram that illustrates a control flow of a system for detecting and handling changes in a drivable area, in accordance with aspects of the disclosure.

FIG. 3 is a schematic that shows a control flow of a system 300 for handling changes in a drivable area, in accordance with aspects of the disclosure. Certain components of the system 300 may be embodied in processor hardware and computer-readable programming instructions that are part of the AV's on board computing system (e.g., on-board computing device 113 of FIG. 1). System 300 may detect physical changes to the drivable area such as the addition or removal of structures.

In some embodiments, the control flow can begin by processing sensor data in a data processing module 302. Sensor data may include a LiDAR dataset, semantic labels, and localization and calibration data. In addition, data processing module 302 may receive LiDAR diagnostics data. LiDAR diagnostics data may be used to determine the accuracy of the LiDAR data. LiDAR data that may be inaccurate may not be used to change the offline map.

In some embodiments, LiDAR data may be generated by a LiDAR system (e.g., LiDAR system 264). The LiDAR dataset may define a plurality of point clouds associated with a plurality of laser emitters of the LiDAR system. For example, each point cloud may be associated with a single laser emitter. The LiDAR dataset may define, for each point in a point cloud, Euclidean X, Y, and Z values relative to a common sensor frame, a measured intensity (e.g., on a scale from 0-255, etc.), a time associated with the measured intensity, and/or a laser emitter number or index of the laser emitter used to obtain the measured intensity. In some aspects, a LiDAR point cloud of the plurality of LiDAR point clouds corresponds to a single 360 degree sweep of the LiDAR system. For example, the LiDAR dataset may include a single accumulated LiDAR sweep, and the sweep may be motion-compensated and provide a full 360 degree coverage of a scene surrounding the LiDAR system.

Semantic labels may associate a semantic class to a LiDAR point cloud. The label may identify a category of the LiDAR point cloud. Semantic labels may include a road, a sidewalk, a road marking, a vegetation, a building, and a type of an object (e.g., car, bicycle). For example, semantic labels may identify a LiDAR point as belonging to a vehicle. The semantic labels may be used to filter out LiDAR points associated with dynamic (moving) objects as discussed further below. In some embodiments, semantic labels may also include a drivable area label.

Localization and calibration data are used to project the LiDAR point into a tile. The tile may include a plurality of pixels or cells. In some aspects, the tile may represent a 30 m×30 m area. Localization data may include geographic information system (GIS) spatial data. A LiDAR point may be mapped to a three dimensional (3D) location with latitude, longitude, and altitude coordinates of a global coordinate system. Calibration data may include known position of an object that may be compared to the LiDAR point cloud.

In some embodiments, data processing module 302 may also retrieve a tile map from a map server 304. The tile map may include ground heights and region of interest (ROI) layers. A ROI layer may include information about the drivable area.

In some aspects, data processing module 302 may transform LiDAR point clouds into a map reference frame (city coordinates). The tile map may be used to add additional ground height attributes to the LiDAR point data.

In some embodiments, dynamic objects (e.g., pedestrians, vehicles, cyclists, trains) may lead to false positives. For example, system 300 may identify a moving vehicle as a structure and thus marks the area as a non-drivable area. Data processing module 302 may remove (filter) data points corresponding to dynamic objects. Removed data points may not be used in the detection of changes in the drivable area. Thus, the removed data points may not be included in an output of the data processing module 302. Data processing module 302 may receive output from or include a semantic segmentation network. In some aspects, data processing module 302 may receive outputs from other modules such as tracking and deep LiDAR used in the implementation of the semantic segmentation network.

The semantic segmentation network may detect object in the sensor data and identify a label to be associated with a pixel or a cell. Data processing module 302 may remove the data points based on the identified label. In addition to or alternatively, data processing module 302 may receive semantic labels as described previously herein. Data processing module 302 may remove data points based on the semantic labels. For example, data processing module 302 may remove data points that are associated with semantic labels that indicate a dynamic object. As described previously, if the semantic segmentation network has a high rate of misclassifying dynamic objects, then system 300 may have a high false positive rate as the system 300 may classify dynamic objects as changed cells. Thus, data processing module 302 may use additional inputs from other modules such as a tracking module to remove data points associated with dynamic objects. In some aspects, the additional inputs may be used when data used by the semantic segmentation network are noisy.

In addition to filtering data points associated with dynamic objects, data processing module 302 may filter data points associated with a location or position beyond a threshold from the ROI (e.g., beyond 1 meter from the ROI). For example, data processing module 302 may filter out data based on the tile map received from map server 304. Thus, system 300 processes data and identify changes in original drivable areas (i.e., identified as drivable area in the base map). This minimizes false positives that are caused by structures surrounding original drivable areas such as trees or buildings.

The processed LiDAR points from data processing module 302 are output to a tile data module 306. Tile data module 306 may accumulate rasterized ground height tile data. Thus, as more LiDAR points are received over time, the LiDAR points are added to the tile in order to reconstruct an onboard map. In some aspects, the points are average for each pixel over time. A cell of the tile may hold the ground height distribution (mean and variance) of all LiDAR points received from data processing module 302 (i.e., after filtering the dynamic points and points that are significantly further than the drivable area) that fall inside the tile. The ground heights of the road surface are obtained from a ground surface tile layer. The ground height layer in the tile map includes statistical data (mean and variance) of ground heights for each cell (e.g., 15 cm×15 cm) in the tile map. In some aspects, the ground heights are normally distributed. Tile data module 306 may create a rasterized image corresponding to a tile. A pixel in the rasterized image corresponds to the cell (e.g., the 15 cm×15 cm cell).

In some embodiments, tile data module 306 may send the tile of ground heights to a matching module 308. Matching module 308 may obtain offline tile of ground heights from map server 304. For example, matching module 308 may retrieve data from a ROI layer containing the drivable area in the offline map stored in map server 304.

In some embodiments, in order to detect newly added structures, matching module 308 compare ground height distributions of corresponding cells (e.g., using Bhattacharyya Distance) within the ROI layer of the drivable area. In some aspects, ground heights distributions include mean and variance of ground heights with respect to a ground surface. In some aspects, mean of ground heights may be used when variance data is not available. If the distributions are significantly different (between ground heights from map server 304 and ground heights from tile data module 306, the cell is classified as "changed". For example, the cell is classified as "changed—new structure" to indicate that a new structure is present in the drivable area. In some aspects, the ground height of the cell may be compared to a threshold height. If the ground height is greater than the threshold (e.g., 15 cm) then cell is classified as changed. The number of cells classified as changed may be identified. If the number of cells is greater than a threshold (e.g., 5 cells), then a map update is triggered. Thus, matching module 308 may send the information associated with the cells to a cluster and polygon computation module 310. The information may include an identifier of the cell and the corresponding tile.

In some embodiments, in order to detect removed structures, matching module 308 may use the ROI layer and compare corresponding cells. In some aspects, a localization k-d tree may be used to extend the ground height layer. If a cell is classified as belonging to the road surface (i.e., small ground height mean and small variance), then the cell is annotated as drivable in the onboard tile map. If the corresponding cell is annotated as non-drivable in the offline map, then the cell is classified as "changed—removed structure". Further, since the ground heights are compared with the ROI layer, removed structures that are within a distance from the ROI are detected. For example, if a bollard is removed but the bollard is more than a threshold distance (e.g., 1 meter) from the ROI, then the change is not detected. This is because, as described previously herein, data processing module 302 and tile data module 306 process data and accumulate ground height of LiDAR points that are within the threshold distance from an original drivable area.

In some embodiments, semantic labels are projected to the points from the LiDAR data and are compared to the ground height from the offline tile of ground heights to detect a change in the drivable area.

In some embodiments, changed cells are classified in one of two groups, either "non-drivable" or "drivable". Not drivable cells are defined as those that are marked as non-drivable in the onboard data but were marked as drivable in the offline map (i.e., map server 304). On the contrary, drivable cells include areas that were non-drivable in the offline map, but the area is now marked as drivable from the onboard data because the structure has been removed.

In some embodiments, cluster and polygon computation module 310 may cluster LiDAR points in each of the above groups and compute a convex hull polygon for each cluster. Cluster and polygon computation module 310 may output area of changes (i.e., polygons) with an indication to whether a new structure is added (i.e., structure that were not included in map server 304) or whether a structure is removed (i.e., structure was in the map but do not exist in the onboard live data). Cluster and polygon module 310 may output the polygon data associated with new structure or removed structure to a map deviation task 312. Polygon data may include ground height data in the 3D space. The new structure may also be represented by other interconnected planar shapes such as a set of triangles, quadrangles, or the like.

Map deviation task 312 may associate the update with a lane segment and send the update to a dynamic vector map 314. A client may query dynamic vector map 314 to obtain updated map information. Clients of the dynamic vector map 314 may include a motion planning module. For example, if the change indicate that an area is not drivable (e.g., a new structure was added) then the motion planning module may alter the navigation route for the AV and mark the area as not drivable. The AV may also perform a full stop if the module is not able to reroute the vehicle. In some aspects, map deviation task 312 may further assign a classification to the changed area. Map deviation task 312 may further output one or more structure types associated with the area of changes. For example, map deviation task 312 may output that a median is added in the middle of a drivable area. Map deviation task 312 may use information from the semantic segmentation network to assign the classes to the area of changes.

In some embodiments, system 300 may further determine whether the detected change is permanent or temporary. In response to a determination that the change is permanent, data in map server 304 may be updated and the change propagated to other vehicles. In response to determining that the change is temporary, dynamic vector map 314 may include a duration for the validity of the change. In some embodiments, map deviation task 312 may output a notification to an off board task to review the change in order to determine whether the change is permanent or temporary.

In some embodiments, weather conditions may present challenges in detecting changes in drivable areas. For example, in snowy areas during the winter season, the roads/driveways covered with snow may have a significant ground height difference compared to the same area in the offline map that may trigger false positives of drivable area changes. In addition, rainy conditions may present challenges as the laser may reflect off wet surfaces/puddles and result in artifacts above the ground. This may cause an increase in the false positive rate. In some embodiments, data received from other sensors (e.g., a camera) may be used to determine whether the drivable area satisfies certain conditions including some predetermined weather conditions. The image from the camera may be compared with ground heights from the offline tile from map server 304 to determine whether the predetermined weather conditions exist. LiDAR data may be further processed before being used to determine whether there is a change in the drivable area. For example, a preset height may be subtracted (e.g., 5 cm) from the ground height if the weather condition is snow.

In some embodiments, an offline operator may be determine whether the changes are a false positive. In response to determining that the change is a false positive, the changes are not added to the map. If an area of the map has a lot of false positive, then the false positive can be ignored by the AV to avoid disruption of the AV.

In some embodiments, system 300 may ignore changes in areas having inaccurate ground surface tile layer. Since, the ground heights are compared to the road surface for determining drivable and non-drivable areas, any inaccuracies in this tile layer may directly influence the performance of the method and system described herein. In some aspects, a tool (e.g., Argonaut) may be used to visualize ground heights layer of both the online and offline tiles.

Figure 4:
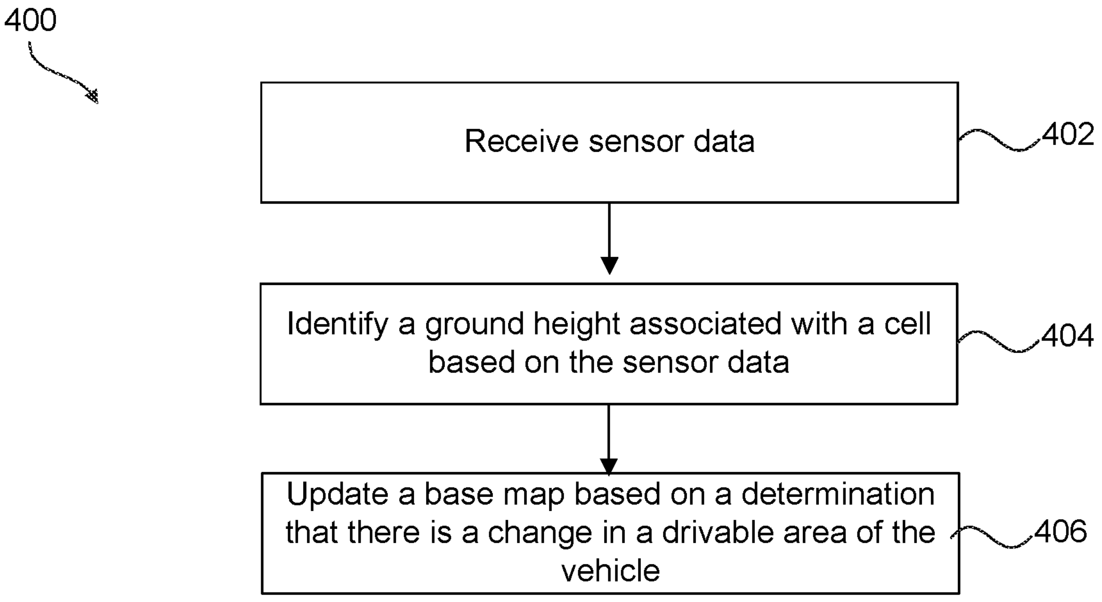
FIG. 4 is a flowchart for a method for detecting and handling changes in a drivable area, in accordance with aspects of the disclosure.

FIG. 4 is a flowchart for a method 400 for detecting and handling changes in a drivable area, in accordance with aspects of the disclosure.

At 402, sensor data is received from a sensor of a vehicle. For example, the vehicle on-board computing device 220 may receive sensor data from LiDAR system 264.

At 404, a ground height associated with a cell of a tile map based on the sensor data is identified. For example, the vehicle on-board computing device 220 may determine ground heights data for the cell of the tile map. The vehicle on-board computing device 220 may aggregate data from multiple LiDAR sweeps and may filter data associated with a dynamic object as described previously herein.

At 406, a base map is updated based on a determination that there is a change in a drivable area of the vehicle. The determination may be based on at least the ground height associated with the cell.

Figure 5:
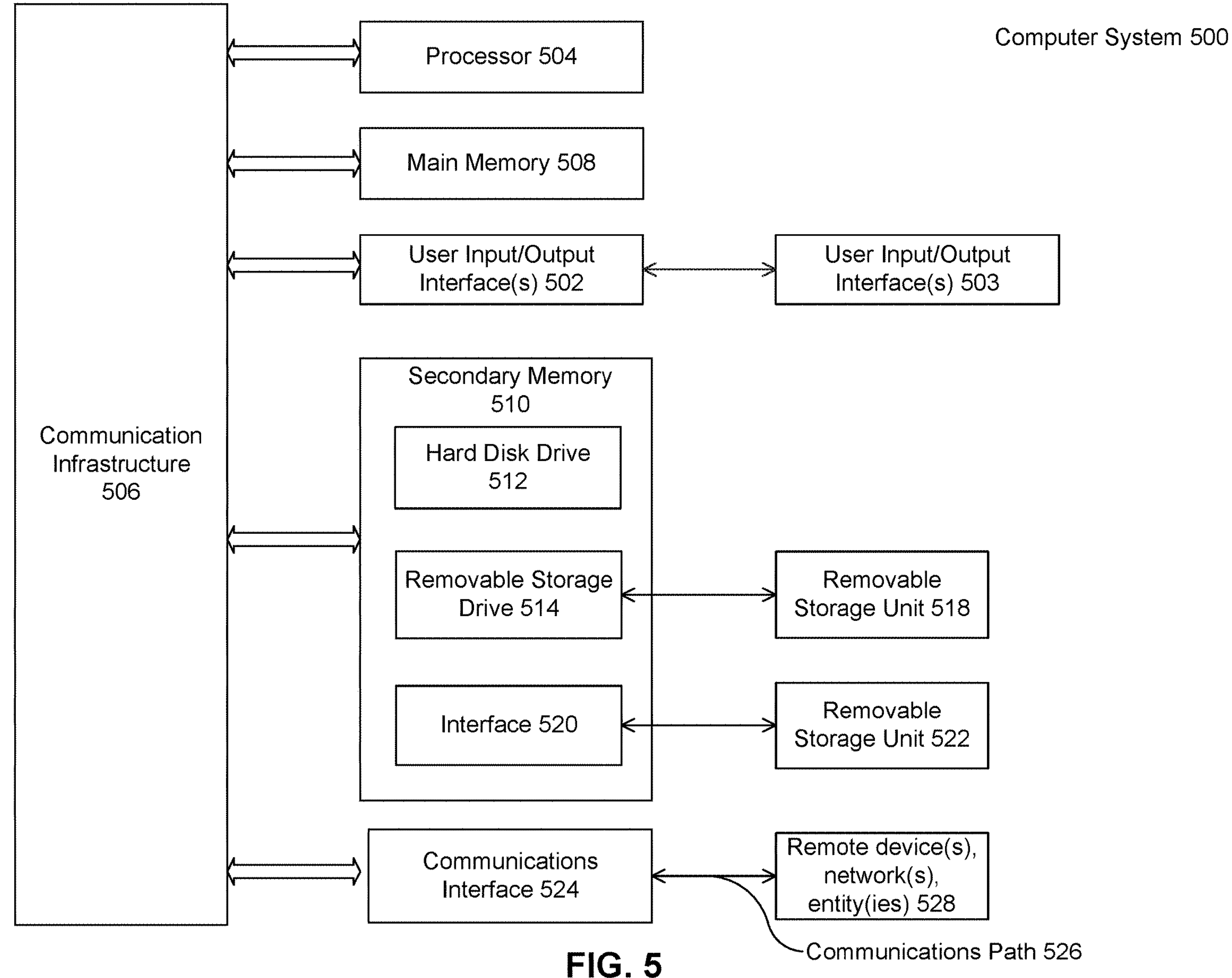
FIG. 5 is an example computer system useful for implementing various embodiments.

Various embodiments can be implemented, for example, using one or more computer systems, such as computer system 500 shown in FIG. 5. Computer system 500 can be any computer capable of performing the functions described herein.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:

determining, by one or more computing devices, a ground height associated with a cell of a tile map based on sensor data from a sensor of a vehicle;

comparing, by the one or more computing devices, the ground height with data stored in a base map defining a drivable area;

updating, by the one or more computing devices, a dynamic vector map in response to a first determination that a difference in the ground height is greater than a first threshold, wherein the difference in the ground height is determined using the data stored in the base map, and the dynamic vector map includes changes to the base map detected during an operation of the vehicle; and updating, by the one or more computing devices, the base map based on a second determination that there is a change in the drivable area of the vehicle and the change is permanent, the second determination being based on at least the ground height and the data stored in the base map.

2. The method of claim 1, further comprising:

assigning, by the one or more computing devices, an attribute indicating the change in the drivable area to the cell when the difference in the ground height is greater than the first threshold; and identifying, by the one or more computing devices, a number of cells of the tile map that are associated with the attribute indicating the change; and wherein the dynamic vector map is updated when the number of cells is greater than a second threshold.

3. The method of claim 1, further comprising:

clustering, by the one or more computing devices, cells into a cluster of the tile map that indicate a new structure in the drivable area or that a structure is removed; and calculating, by the one or more computing devices, a polygon for the cluster indicating an area of the new structure or the area indicating where the structure have been removed.

4. The method of claim 1, wherein the sensor data includes a plurality of LiDAR points, the method further comprising:

filtering, by the one or more computing devices, a LiDAR point of the plurality of LiDAR points in response to a determination that the LiDAR point is associated with a dynamic object.

5. The method of claim 4, wherein the sensor data includes a semantic label associated with the LiDAR point of the plurality of LiDAR points, the method further comprising:

filtering, by the one or more computing devices, the LiDAR point based on the semantic label.

6. A system, comprising:

a memory; and at least one processor coupled to the memory and configured to perform operations comprising:

determining a ground height associated with a cell of a tile map based on sensor data from a sensor of a vehicle, comparing the ground height with data stored in a base map defining a drivable area, updating a dynamic vector map in response to a first determination that a difference in the ground height is greater than a first threshold, wherein the difference in the ground height is determined using the data stored in the base map, and the dynamic vector map includes changes to the base map detected during an operation of the vehicle; and updating the base map in response to a second determination that there is a change in the drivable area of the vehicle and the change is permanent, the second determination being based on at least the ground height and the data stored in the base map.

7. The system of claim 6, the operations further comprising:

assigning an attribute indicating the change in the drivable area to the cell when the difference in the ground height is greater than the first threshold;

identifying a number of cells of the tile map that are associated with the attribute indicating the change; and a wherein the dynamic vector map is updated when the number of cells is greater than a second threshold.

8. The system of claim 6, the operations further comprising:

clustering cells of the tile map into a cluster that indicate a new structure in the drivable area; and calculating a polygon for the cluster indicating an area of the new structure.

9. The system of claim 6, wherein the sensor data includes a plurality of LiDAR points, the operations further comprising:

filtering a LiDAR point of the plurality of LiDAR points in response to a determination that the LiDAR point is associated with a dynamic object.

10. The system of claim 9, wherein the sensor data includes a semantic label associated with the LiDAR point of the plurality of LiDAR points, the operations further comprising:

filtering the LiDAR point based on the semantic label.

11. A non-transitory computer-readable medium having instructions stored thereon that, when executed by at least one computing device, cause the at least one computing device to perform operations comprising:

determining a ground height associated with a cell of a tile map based on sensor data from a sensor of a vehicle;

comparing the ground height with data stored in a base map defining a drivable area;

updating a dynamic vector map in response to a first determination that a difference in the ground height is greater than a first threshold, wherein the difference in the ground height is determined using the data stored in the base map, and the dynamic vector map includes changes to the base map detected during an operation of the vehicle; and updating the base map based on a second determination that there is a change in the drivable area and the change is permanent, the second determination being based on at least the ground height and the data stored in the base map.

12. The non-transitory computer-readable medium of claim 11, the operations further comprising:

assigning an attribute indicating the change in the drivable area to the cell when the difference in the ground height is greater than the first threshold;

identifying a number of cells of the tile map that are associated with the attribute indicating the change; and a wherein the dynamic map vector is updated when the number of cells is greater than a second threshold.

13. The non-transitory computer-readable medium of claim 11, the operations further comprising:

clustering cells of the tile map into a cluster that indicate a new structure in the drivable area; and calculating a polygon for the cluster indicating an area of the new structure.

14. The non-transitory computer-readable medium of claim 11, wherein the sensor data includes a plurality of LiDAR points and wherein the operations further comprising:

filtering a LiDAR point of the plurality of LiDAR points in response to a determination that the LiDAR point is associated with a dynamic object.

* * * * *